United States Patent [19]

Kumakura

[11] 4,191,988
[45] Mar. 4, 1980

[54] IDENTIFICATION LAMP APPARATUS

[76] Inventor: Shokichi Kumakura, 5-3, Funabori 2 chome, Edogawa-ku, Tokyo, Japan

[21] Appl. No.: 864,290
[22] Filed: Dec. 27, 1977
[51] Int. Cl.² ............................................. F21L 13/00
[52] U.S. Cl. ....................................... 362/72; 362/192
[58] Field of Search ........................... 362/192, 193, 72

[56] References Cited

U.S. PATENT DOCUMENTS

| 2,505,154 | 4/1950 | Smith | 362/192 |
| 3,987,409 | 10/1976 | Freeman | 362/72 |

FOREIGN PATENT DOCUMENTS

| 209201 | 10/1959 | Austria | 362/72 |
| 828055 | 10/1950 | Fed. Rep. of Germany | 362/192 |
| 1009277 | 5/1957 | Fed. Rep. of Germany | 362/192 |

Primary Examiner—Samuel W. Engle
Assistant Examiner—Edward F. Miles
Attorney, Agent, or Firm—Frank J. Jordan

[57] ABSTRACT

An identification lamp is mounted on a rotary member which is rotatable on a stationary shaft, for rotation about the shaft as the member rotates. The shaft carries a stator having permanent magnets while a rotor assembly is fixedly mounted on the rotary member and includes a coil which rotates around the stator together with the member. The lamp is energized by an electric power developed across the coil, and means is provided for selectively deciding whether the lamp is to be energized or deenergized. The application of the invention to the wheel of a bicycle is disclosed.

3 Claims, 5 Drawing Figures

IDENTIFICATION LAMP APPARATUS

FIELD AND BACKGROUND OF THE INVENTION

The invention relates to an identification lamp apparatus, and more particularly to such apparatus for bicycle use including a lamp which rotates about the axis of a wheel as the latter rotates.

It is a conventional practice to mount a reflecting mirror unit on the mudguard which is provided on the rear part of a bicycle. The use of the reflecting mirror unit as an identification mark during the nighttime involves a number of drawbacks. Specifically, when an automobile moves close from behind a running bicycle, the light from the headlight of the automobile which is reflected may be directed in directions out of the field of sight of the driver of the automobile. When an automobile moves close to the bicycle in a direction offset from the running direction of the bicycle, for example, in a direction spaced 90° therefrom, the reflecting mirror unit cannot be exposed to the illumination from the headlight of such automobile. It is statistically found that a high proportion of collision accidents between automobiles and bicycles during the nighttime is caused by these factors.

In consideration of this fact, the inventor contemplated the mounting of a lamp on the spoke of the wheel of a bicycle for rotation around the axis thereof, and conducted repeated experiments to run the bicycle while illuminating the lamp. As a result of such experiments, it is found that the location of such lamp has substantially no dead angle, but rather occasioned a high level of attention on the part of automobile drivers. However, in the prior art, there is no system available for supplying power to such lamp. The inventor has attempted to attach a battery box on the wheel for the purpose of feeding the lamp. Alternatively, the wheel has been provided with a slip ring unit which can be used to feed the lamp from an external power source. Either attempt failed to provide a satisfactory solution.

SUMMARY OF THE INVENTION

It is an object of the invention to provide an identification lamp apparatus for bicycle which includes a lamp mounted for rotation about the axis of a wheel as the wheel rotates, and which includes a dynamoelectric machine mounted on the wheel to feed the lamp.

In accordance with the invention, there is provided an identification lamp apparatus to be mounted on a rotary member which rotates around a stationary shaft; comprising a lamp carried by the rotary member for rotation about the shaft as the member rotates, a stator assembly including permanent magnets and supported on the shaft, a rotor assembly carried by the rotary member and including a coil disposed around the stator for rotation together with the rotary member to produce an electric power thereacross, means for electrically connecting the lamp with the coil, and means for selectively determining whether the lamp is to be energized or deenergized.

In the identification lamp apparatus, the means to determine whether the lamp is to be illuminated or not may comprise a switch which is operative to open or close a circuit connection between the lamp and the coil. During the daytime when the lamp is not to be illuminated, additional force will be required of the bicycle driver to compensate for a magnetic action between the rotor and the stator, even though the increment is slight. However, the additional increment can be substantially eliminated by replacing the switch by an adjusting unit which controls the stator so that it can be made freely movable about the shaft together with the rotor when the lamp is not to be illuminated.

DESCRIPTION OF PREFERRED EMBODIMENTS

Figure 1:
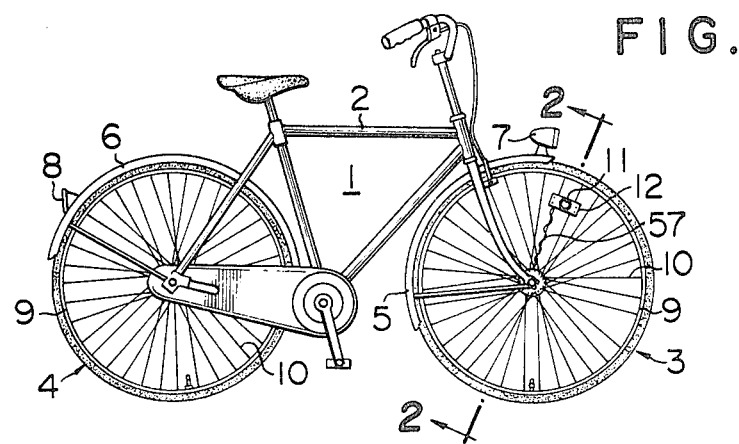
FIG. 1 is a side elevation of a common bicycle provided with the identification lamp apparatus of the invention.

Referring to FIG. 1, there is shown a bicycle 1 of a usual design and comprising a frame member 2 on which a front and a rear wheel 3, 4 are mounted. The bicycle 1 is provided with a front and a rear mudguard 5, 6. The front mudguard 5 fixedly carries a head lamp 7 of a known form while the rear mudguard 6 fixedly carries a reflecting mirror unit 8 of a known form. Each of the wheels 3, 4 has a number of spokes 10 which support a rim 9. In accordance with the invention, the front wheel 3 is provided with an identification lamp 11 which is carried by at least two adjacent spokes 10. The lamp 11 is adapted to rotate about the axis of the wheel 3 as the latter rotates. The lamp 11 is mounted on a support member 12 fixedly attached to the spokes 10 in a manner so that the lamp is visible from either side of the wheel 3. It is to be understood that the support member does not form part of the present invention. When the bicycle is driven with the usual speed, it is recognized that the locus of the front wheel 3 depicts a zigzag path with a relatively high frequency though with a reduced amplitude. This assures that the identification lamp 11 mounted on the front wheel 3 is visible not only from the lateral direction, but also from the rear as well as the front side of the bicycle 1. For this reason, it is preferred that the identification lamp apparatus of the invention be mounted on the front wheel 3 of the bicycle 1, but it may be mounted on the rear wheel 4 without departing from the scope of the present invention.

Figure 2:
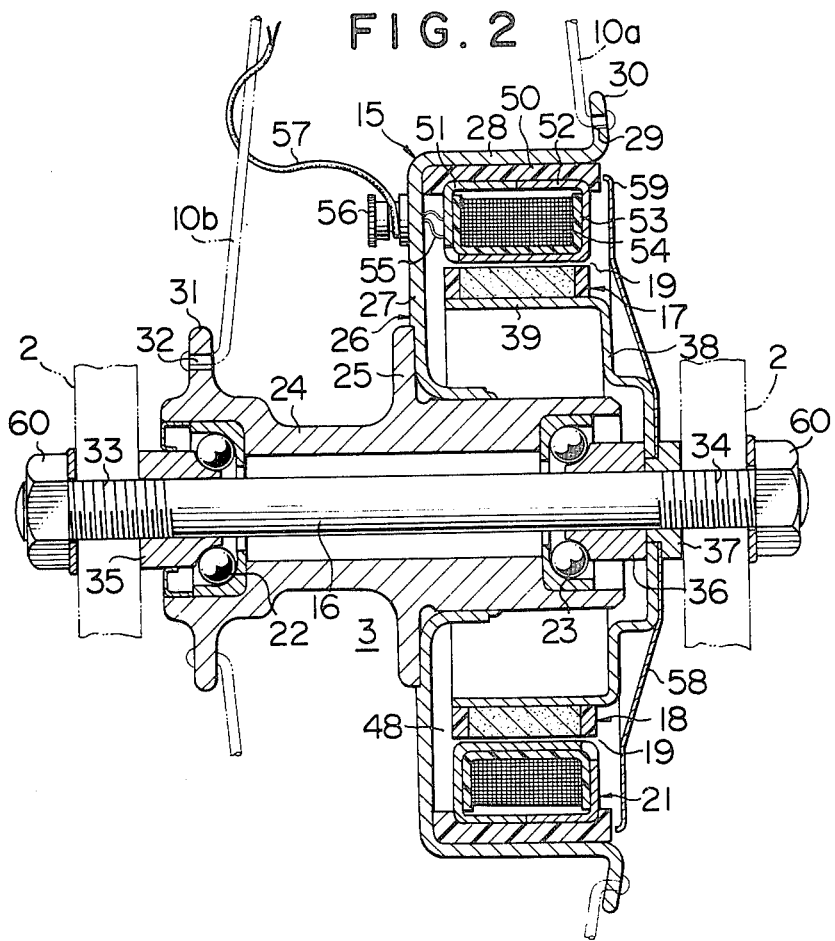
FIG. 2 is a fragmentary cross section taken along the line 2—2 shown in FIG. 1.

FIG. 2 shows the detail of a dynamoelectric machine or generator 15 which generates power to feed the identification lamp 11. Specifically, the dynamoelectric machine 15 includes a stator 18, and a rotor assembly 21 which is disposed in concentric relationship with the stator 18 and spaced therefrom by a gap 19. The stator comprises an annular magnet assembly 17 which is disposed around a stationary shaft 16 of the wheel 3. The rotor assembly 21 includes a coil 54. The wheel 3 includes a hub 24 which is supported on the stationary shaft 16 by means of a pair of ball bearings 22, 23, and the hub 24 has a mounting flange 25 substantially at the center lengthwise thereof which firmly holds a hub wheel 26 fitted around the hub 24. The hub wheel 26 includes a sidewall 27 and an annular portion 28, the edge of which is formed with a small flange 30 having perforations 29 formed therein for securing the end of one set of spokes 10a of the wheel 3. The other set of spokes 10b of the wheel 3 is anchored to perforations 32 formed in a flange 31 which is disposed at one end of the hub 24, generally in the similar manner as in the conventional bicycle.

The opposite ends of the shaft 16 are formed with male threads 33, 34, which are separately and threadably engaged by the fixed races 35, 36 of the ball bearings 22, 23, respectively. The thread 34 is also threadably engaged by a clamp nut 37 which is used to support a stationary drum 38 firmly against the fixed race 36. The fixed drum 38 includes an annular portion 39 extending into the annular space 48 defined inside the hub wheel 26, and is utilized to adhesively secure the annular magnet assembly 17 thereon as it is snugly fitted therein.

Figure 3:
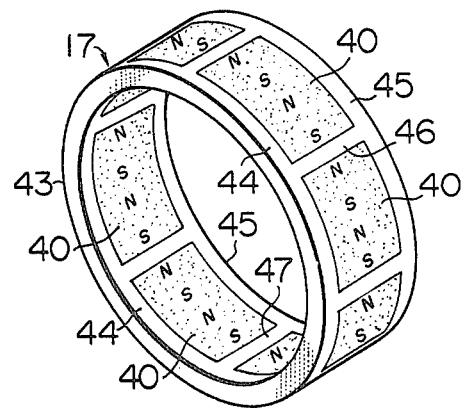
FIG. 3 is a perspective view of an annular magnet assembly shown in FIG. 2.
Figure 4:
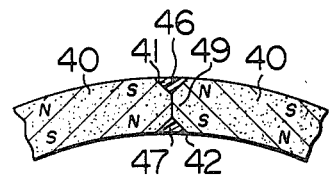
FIG. 4 is a fragmentary cross section of the annular magnet assembly of FIG. 3 as taken along a radial plane.

As will be noted from FIGS. 3 and 4, the annular magnet assembly 17 comprises an array of a plurality of arcuate permanent magnets 40 which are disposed so that their ends 49 are in abutment against each other. Small recesses 41, 42 which are substantially triangular in cross section are formed between adjacent magnets 40 along their outer and inner surfaces. The magnets are rigidly secured together in an annular array by a support member 43, which includes a pair of annular portions 44, 45 tightly engaging the opposite sides of the annular array, and a plurality of ledge portions 46, 47 which extend through the recesses 41, 42 to interconnect the pair of annular portions 44, 45. Each permanent magnet 40 is formed of an anisotropic ceramic material, for example, ferrite, which is formed in a magnetic field by known techniques to be magnetized in the radial direction. Along its outer and inner surfaces, the annular assembly 17 comprises a multiplicity of magnetic pole surfaces which are alternately N- and S-poles. The detail of such magnet assembly 17 is described in more detail in pending patent application Ser. No. 808,218 filed by the present applicant.

The rotor assembly 21 is tightly fitted inside the annular portion 28 of the hub wheel 26 and is supported by a support ring 50 formed of a non-magnetic material such as synthetic resin, whereby it is firmly secured to the hub wheel 26. The construction of such rotor assembly 21 is well known in the art and therefore will not be described in detail. However, briefly, it comprises a pair of iron members 21, 22 which have complementary shape to form an annular hollow iron assembly, each including a number of comb-shaped pole pieces extending from the periphery thereof in staggered relationship between the pole pieces of the members 51, 52. The assembly 21 also includes a bobbin 53 which is U-shaped in cross section and fitted into the annular hollow space, and a coil 54 disposed on the bobbin 53. The respective pole pieces of the iron members 51, 52 are spaced from the outer surface of the annular magnet assembly 17 by a small gap 19. It is to be understood that the coil 54 is disposed in concentric relationship with the stator 18, and has lead wires 55 which are electrically connected with a switch 56 mounted on the outside of the sidewall 27 of the hub wheel 26. The switch 56 is connected with a lead wire 57 extending from the identification lamp 11 (see FIG. 1) mounted on the wheel 3.

Preferably the space 48 defined by the hub wheel 26 and which is utilized to house the stator 18 and the rotor 21 is closed by a sideplate 58 in order to prevent the ingress of water or dusts. The sideplate 58 can be secured together with the stationary drum 38 on the shaft 16 between the fixed race 36 and the clamp nut 37, and has its periphery 59 closely spaced from the support ring 50 of the rotor assembly 21. The clearance therebetween can be made negligibly small by disposing the peripheral edge 59 of the sideplate 58 in an annular groove (not shown) formed in the support ring 50.

The wheel 3 is mounted on the frame 2 by securing the opposite ends of the shaft 16 to the frame 2 of the bicycle by means of mounting screws 60.

In operation, as the wheel 3 rotates to cause a rotation of the rotor 21 around the stator 18, the flux from the annular magnet assembly 17 passes through the iron members 51, 52 to link with the coil 54 of the rotor 21, whereby a voltage is developed across the coil 54. The voltage is fed through the switch 56 to the identification lamp 11 mounted on the wheel 3, thus illuminating the lamp 11. When a dynamoelectric machine is constructed in this manner by mounting the stator 18 on the shaft 16 and mounting the rotor 21 on the hub 24, the number of revolutions of the rotor 21 will be on the order of two revolutions per second. However, since the magnetic efficiency of the magnet assembly 17 can be substantially increased, sufficient power is produced to illuminate the identification lamp 11. The dynamoelectric machine does not include any member which is placed in resilient engagement with the wheel as in a conventional arrangement utilizing a roller which engages the tyre thereof. Since the machine is mounted directly on the shaft 16, driver of the bicycle will feel no increased load in driving the machine. During the daytime when the lamp 11 is not illuminated, the switch 56 may be opened, whereupon the machine is under no load, thus reducing the mechanical load on the bicycle.

Figure 5:
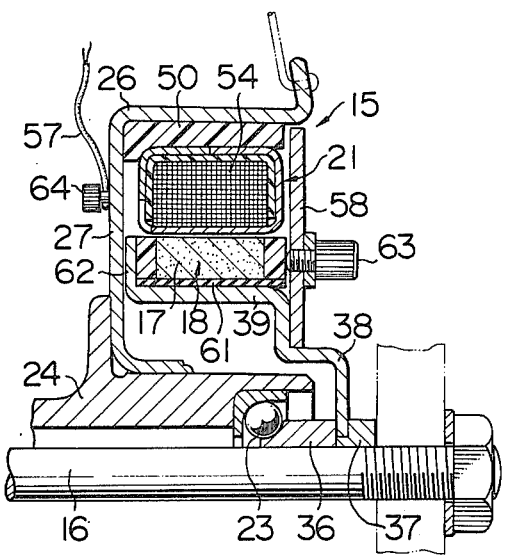
FIG. 5 is a fragmentary cross section of another embodiment of the invention.

FIG. 5 shows another embodiment of the invention in which the stator is made freely movable instead of opening the switch when the lamp is not illuminated. In this Figure, similar parts are designated by like reference characters. In the dynamoelectric machine 15 shown, the annular magnet assembly 17 which is constructed in the similar manner as before forms the stator 18 and includes a bearing lining 61, which slidably engages the outer surface of the annular portion 39 of the stationary drum 38. The annular portion 39 of the stationary drum 38 includes a flange 62 which extends in the radial direction from the inner end thereof, and the sideplate 58 is rigidly mounted on the opposite end of the annular portion 39, with the stator 18 being received in the space between the flange 62 and the sideplate 58. The sideplate 58 is provided with an adjusting screw 63 which urges the stator 18 in a direction toward the flange 62, the arrangement being such that the screw 63 can be adjusted to lock the stator 18 to the stationary drum 38 or to release it therefrom. As before, the rotor assembly 21 is firmly secured in place by the support ring 50 and the hub wheel 26, with the coil 54 being electrically connected with the terminal 64 provided on the outside of the sidewall 27 of the hub wheel 26. The terminal 64 is connected with the lead wire 57 of the identification lamp 11 (see FIG. 1).

When the dynamoelectric machine is used, the screw 63 can be tightened to lock the stator 18 against the stationary drum 38 when it is desired to illuminate the lamp 11. Conversely, when the lamp 11 is not energized, the adjusting screw 63 may be loosened to free the stator 18 from the drum 38. Since the screw 63 is disposed at a location closer to the shaft 16 than the flange 30 of the hub wheel 26 to which the spokes 10a are anchored, it can be easily operated from the exterior without interference by the spokes 10a. When released, the stator 18 slides along the stationary drum 38 as the rotor 21 rotates, as a result of the magnetic interaction with the rotor 21, so that no electric power is produced across the coil 54. In addition, the bicycle can be driven without requiring any additional force. A bearing surface which correspond to the lining 61 on the stator 18 may be provided on the outer surface of the annular portion 39 of the stationary drum 38. When the lining 61 is formed of a magnetic material, it functions to provide a magnetic path of minimum length between adjacent poles on the annular magnet assembly 17 which forms the stator 18, thus minimizing the leakage flux. A similar concept is applicable to the stationary drum 38 of the previous embodiment.

What is claimed is:

1. An identification lamp apparatus to be mounted on a wheel of a bicycle which rotates around a stationary shaft, comprising a lamp carried by the wheel, a hub rotatably mounted on the shaft, a hub wheel secured to the hub and including a first annular portion which defines an annular space around the hub, a drum member having a second annular portion which extends axially into the annular space, a sideplate mounted on the drum member and disposed radially to extend perpendicularly to the second annular portion, a stator assembly including permanent magnets and slidably supported on the outer surface of the second annular portion, a rotor assembly including a coil to produce an electric power thereacross, the rotor assembly being fixedly mounted on the inner surface of the first annular portion, a lining mounted between the permanent magnets and the outer surface of the second annular portion, and adjusting screw means provided on the sideplate and extending into said annular space for selectively locking the permanent magnets to the drum member to adjust whether the lamp is to be energized or deenergized.

2. An identification lamp apparatus according to claim 1, in which the lining is in the form of a magnetic material.

3. An identification lamp apparatus according to claim 1 wherein said bicycle wheel has a plurality of spokes, said hub wheel having a flange adapted to anchor said spokes, said flange being disposed radially outwardly of said sideplate and of said rotor assembly, said adjusting screw means comprising an actuating member mounted on said sideplate and disposed radially inwardly of said flange, whereby said actuating member is readily accessible for manual manipulation without interference from said spokes.

* * * * *